(12) United States Patent
Yoshimura (10) Patent No.: US 10,185,732 B2
(45) Date of Patent: Jan. 22, 2019

(54) INFORMATION PROCESSING APPARATUS, INFORMATION PROCESSING METHOD, AND NON-TRANSITORY COMPUTER READABLE MEDIUM

(71) Applicant: FUJI XEROX CO., LTD., Tokyo (JP)

(72) Inventor: Toshihide Yoshimura, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 231 days.

(21) Appl. No.: 15/053,230

(22) Filed: Feb. 25, 2016

(65) Prior Publication Data

US 2017/0004161 A1 Jan. 5, 2017

(30) Foreign Application Priority Data

Jul. 2, 2015 (JP) .................................. 2015-133179

(51) Int. Cl.
*G06F 17/30* (2006.01)
*H04L 29/08* (2006.01)
*H04L 29/06* (2006.01)

(52) U.S. Cl.
CPC .... *G06F 17/30336* (2013.01); *G06F 17/3089* (2013.01); *G06F 17/30864* (2013.01); *H04L 63/10* (2013.01); *H04L 63/168* (2013.01); *H04L 67/02* (2013.01)

(58) Field of Classification Search
CPC ............................................... G06F 17/30336
See application file for complete search history.

(56) References Cited

U.S. PATENT DOCUMENTS

| 2002/0023122 | A1* | 2/2002 | Polizzi | G06F 17/30873 709/202 |
| 2002/0038296 | A1* | 3/2002 | Margolus | G06F 17/30097 |
| 2004/0139063 | A1* | 7/2004 | Moskovich | G06F 17/30312 |
| 2005/0050023 | A1* | 3/2005 | Gosse | G06F 17/30864 |
| 2005/0289354 | A1* | 12/2005 | Borthakur | G06F 21/6227 713/182 |
| 2007/0100824 | A1* | 5/2007 | Richardson | G06F 17/30864 |
| 2009/0164447 | A1* | 6/2009 | Daya | G06F 17/30867 |
| 2009/0235187 | A1* | 9/2009 | Kim | G06F 17/30905 715/760 |

(Continued)

FOREIGN PATENT DOCUMENTS

| CN | 105631030 A | * | 6/2016 |
| JP | 2002-007347 A | | 1/2002 |
| JP | 2008-015611 A | | 1/2008 |

*Primary Examiner* — Syed H Hasan
(74) *Attorney, Agent, or Firm* — Oliff PLC (57) ABSTRACT

An information processing apparatus includes a first memory that stores information on plural websites and access rights of a user to the plural websites, in association with each other, an indexing unit that accesses each of the plural websites in accordance with the access rights of the user, and generates an index of content of the plural websites, a second memory that stores the index generated by the indexing unit in association with the user, a controller that controls such that a portal site representing an entry point to the plural websites is displayed, a receiving unit that receives, on the portal site, an input of search conditions for the plural websites from the user, and a searching unit that searches the index stored in association with the user in the second memory, in accordance with the input search conditions.

6 Claims, 9 Drawing Sheets

(56) References Cited

U.S. PATENT DOCUMENTS

2009/0287658 A1* 11/2009 Bennett ............. G06F 17/30867
2009/0287684 A1* 11/2009 Bennett ............... G06F 17/3089
2012/0259832 A1* 10/2012 Walker .............. G06F 17/30887
                                                                                                               707/709

* cited by examiner

| | ATTRIBUTES | VALUE |
|---|---|---|
| 512 | URL | http://www.ffffxxxxx.co.jp/xxx/yyy/zzz/ |
| 514 | URL TO BE CRAWLED | http://www.ffffxxxxx.co.jp/xxx/yyy/zzz/* |
| 516 | URL NOT TO BE CRAWLED | |
| 518 | URL TO BE SEARCHED | http://www.ffffxxxxx.co.jp/xxx/yyy/zzz/* |
| 520 | URL NOT TO BE SEARCHED | http://www.ffffxxxxx.co.jp/xxx/yyy/zzz/priv/* |
| 522 | CRAWL DEPTH | 10 |
| 524 | CRAWL INTERVAL (msec) | 5000 |
| 526 | NUMBER OF CRAWLING THREADS | 5 |

FIG. 6

| USER ID | SERVICE A URL | LOGIN ID | PASSWORD | SERVICE B URL | LOGIN ID | PASSWORD | ... |
|---|---|---|---|---|---|---|---|
| 50001 | https://www.a.co.jp | a0001 | xxxxx | https://www.b.co.jp | b0001 | yyyyy | |

FIG. 7

| UID | URL | KEYWORD | STATUS | UPDATE DATE AND TIME | PRIORITY POINT |
|---|---|---|---|---|---|
| taro | http://www.ffffxxxxx.co.jp/xxx/yyy/zzz/aaa | printer; FAX; print; | 200 | ... | ... |
| jiro | http://www.ffffxxxxx.co.jp/xxx/yyy/zzz/bbb | | 403 | ... | ... |
| hanako | http://www.ffffxxxxx.co.jp/xxx/yyy/zzz/ccc | solution; problem; | 200 | ... | ... |

| UID | URL | KEYWORD | STATUS | UPDATE DATE AND TIME | PRIORITY POINT |
|---|---|---|---|---|---|
| taro | http://www.ffffxxxxx.co.jp/xxx/yyy/zzz/aaa | printer; FAX; print; | 200 | ... | 50 pt |
| taro | http://www.ffffxxxxx.co.jp/xxx/yyy/zzz/bbb | | 403 | ... | 47 pt |
| taro | http://www.ffffxxxxx.co.jp/xxx/yyy/zzz/ccc | solution; problem; | 200 | ... | 30 pt |
| ... | ... | ... | ... | ... | ... |

FIG. 10

| UID | KEYWORD | INPUT DATE AND TIME |
|---|---|---|
| taro | PRINTER | 2015/3/5 15:02 |
| taro | SUPPLIES | 2015/3/4 15:02 |
| taro | PRINTER | 2015/3/3 15:02 |
| ... | ... | ... |

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-133179 filed Jul. 2, 2015.

BACKGROUND

Technical Field

The present invention relates to an information processing apparatus, an information processing method, and a non-transitory computer readable medium.

SUMMARY

According to an aspect of the invention, there is provided an information processing apparatus including a first memory that stores information on plural websites and access rights of a user to the plural websites, in association with each other; an indexing unit that accesses each of the plural websites in accordance with the access rights of the user, and generates an index of content of the plural websites; a second memory that stores the index generated by the indexing unit in association with the user; a controller that controls such that a portal site representing an entry point to the plural websites is displayed; a receiving unit that receives, on the portal site, an input of search conditions for the plural websites from the user; and a searching unit that searches the index stored in association with the user in the second memory, in accordance with the input search conditions.

BRIEF DESCRIPTION OF THE DRAWINGS

An exemplary embodiment of the present invention will be described in detail based on the following figures, wherein.

DETAILED DESCRIPTION

Hereinafter, an exemplary embodiment of the present invention will be described with reference to the accompanying drawings.

Figure 1:
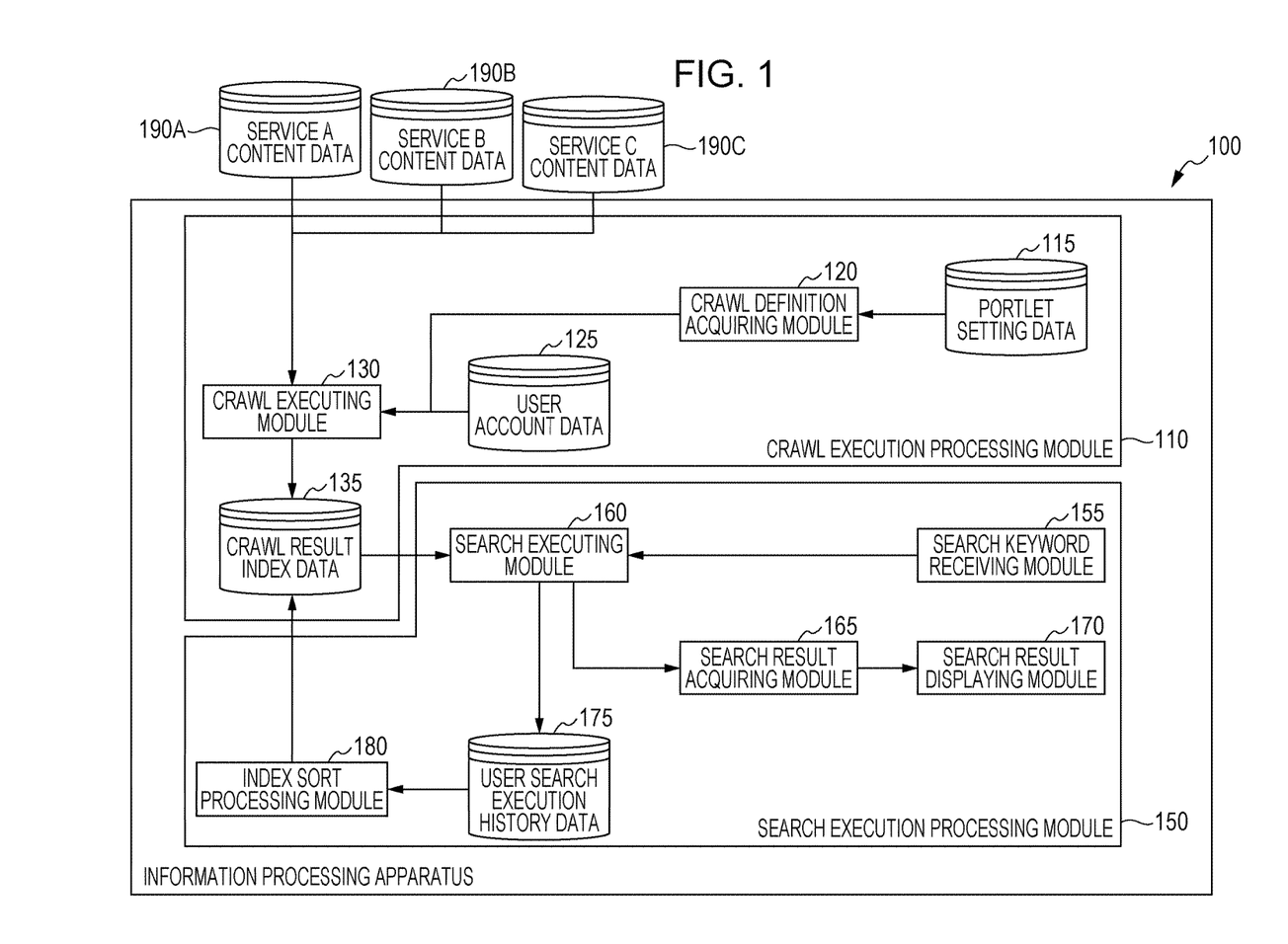
FIG. 1 is a conceptual module configuration diagram illustrating an example of the configuration according to an exemplary embodiment.

FIG. 1 is a conceptual module configuration diagram illustrating an example of the configuration according to this exemplary embodiment.

In general, a module refers to a component, such as software that is logically separable (a computer program), hardware, or the like. Thus, a module in the exemplary embodiment refers to not only a module in terms of a computer program but also a module in terms of hardware configuration. Accordingly, the description of the module for the exemplary embodiment serves as the description of a computer program for causing a computer to function as such modules (a program for causing a computer to execute individual procedures, a program for causing a computer to function as individual units, and a program for causing a computer to implement individual functions), a system, and a method. For convenience of explanation, the expressions "to store something" and "to cause something to store something", and other equivalent expressions are used. In the case where an exemplary embodiment concerns a computer program, these expressions mean "to cause a storage device to store something" or "to control a storage device to store something". Further, modules may have a one-to-one correspondence with functions. In terms of implementation, however, a single module may be implemented by a single program, or multiple modules may be implemented by a single program. Conversely, a single module may be implemented by multiple programs. Also, multiple modules may be executed by a single computer, or a single module may be executed by multiple computers in a distributed or parallel environment. A single module may include another module. Furthermore, the term "connection" as used herein refers to not only physical connection but also logical connection (such as transmission and reception of data or an instruction, and reference relationship between pieces of data). The term "predetermined" means being determined prior to a target operation. This term means not only being determined before a process of this exemplary embodiment is started, but also being determined even after a process of this exemplary embodiment is started, in accordance with the condition and state at that time or in accordance with the condition and state before that time, as long as prior to the target operation. If there are plural "predetermined values", these values may differ from each other, or two or more (or all) of these values may be equal to each other. The expression "if A, do B" is used to indicate that "determine whether A is true, and do B if A is true". However, this does not apply when a determination of whether A is true is not required.

Further, a system or an apparatus may be implemented by multiple computers, hardware units, devices, or the like that are connected to each other via a communication medium, such as a network (including communication connection having a one-to-one correspondence), or may be implemented by a single computer, hardware unit, device, or the like. The terms "apparatus" and "system" are used synonymously. It is to be understood that the "system" does not include anything that is merely a man-made social "mechanism" (social system).

Further, target information is read from a storage device for each process performed by a module or, if plural processes are performed within a module, for each of the plural processes. After the process is performed, the processing result is written into the storage device. Accordingly, reading from the storage device before the process and writing into the storage device after the process may not necessarily be described herein. Examples of storage devices used herein may include a hard disk, a random access memory (RAM), an external storage medium, a storage device connected via a communication line, and a register in a central processing unit (CPU).

An information processing apparatus 100 according to this exemplary embodiment builds a portal site that provides an entry point to plural websites. As illustrated in the example of FIG. 1, the information processing apparatus 100 includes a crawl execution processing module 110 and a search execution processing module 150.

Note that a portal (or a portal site) is a site serving as an entry point to various websites. In the description of this exemplary embodiment, a portal is a site serving an entry point that aggregates access to plural service sites. In particular, a portal described in this exemplary embodiment is chiefly a membership portal site. That is, the user needs to log in so as to use a portal site, and the user (more specifically, the user ID of the user) using the portal site may be used in this exemplary embodiment.

A portlet is a program capable of adding functions and information to (the top page of) a portal site. Generally, a portlet is generated as a small program in Java (registered trademark) or the like. In the description of this exemplary embodiment, a portlet is one that implements a function of displaying pages provided by each service as a part of the portal site.

A crawler is an automated crawling program that acquires information on various websites on the Internet so as to generate a search database index. The crawler is also called a robot. In the description of this exemplary embodiment, a crawler is a program that crawls the content of each service provided via a portlet.

The crawl execution processing module 110 includes portlet setting data 115, a crawl definition acquiring module 120, a user account data 125, a crawl executing module 130, and a crawl result index data 135. The crawl execution processing module 110 generates an index used for a search, from websites (a service A content data processing apparatus 190A, a service B content data processing apparatus 190B, and a service C content data processing apparatus 190C) that are accessible by a login user (hereinafter also referred to as simply a "user").

The search execution processing module 150 includes a search keyword receiving module 155, a search executing module 160, a search result acquiring module 165, a search result displaying module 170, user search execution history data 175, and an index sort processing module 180. The search execution processing module 150 controls such that a portal site representing an entry point to plural websites is displayed. Then, in accordance with a search instruction from a user, the search execution processing module 150 performs a search, using the index created by the crawl execution processing module 110.

Figure 5:
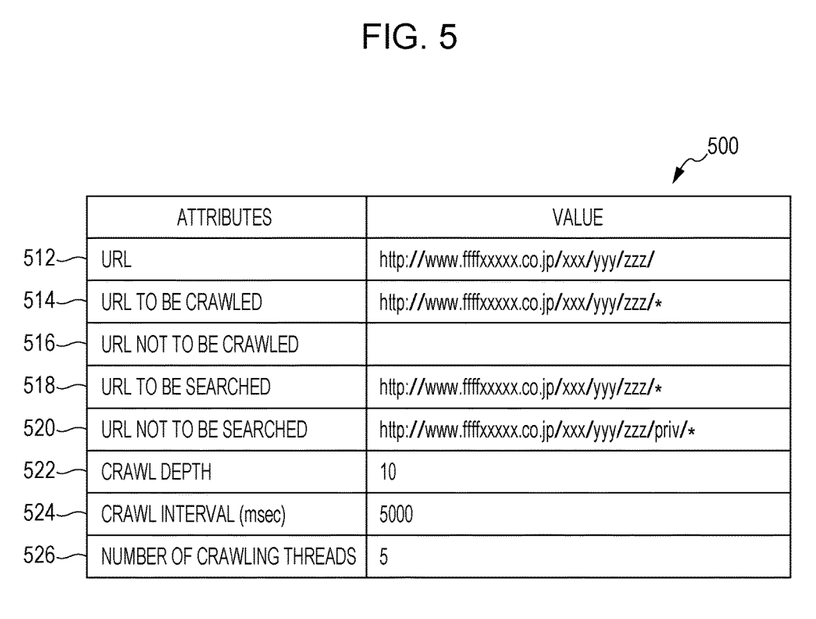
FIG. 5 illustrates an example of the data configuration of a crawl definition table.

The portlet setting data 115 is connected to the crawl definition acquiring module 120. The portlet setting data 115 stores data such as crawl-related data held for each portlet. The portlet setting data 115 is referred to each time the crawl definition acquiring module 120 performs a crawl. For example, the portlet setting data 115 stores a crawl definition table 500. FIG. 5 illustrates an example of the data configuration of the crawl definition table 500. The crawl definition table 500 includes, as the attributes, a URL field 512, a URL to be crawled field 514, a URL not to be crawled field 516, a URL to be searched field 518, a URL not to be searched field 520, a crawl depth field 522, a crawl interval field 524, and a number of crawling threads field 526, for example. The URL field 512 stores the URL of a website to be crawled. The URL to be crawled field 514 stores the URL of a website to be crawled. The URL to be crawled field 514 is used for further limiting the URL in the URL field 512. The URL not to be crawled field 516 stores the URL of a website excluded from the website to be crawled. The URL to be searched field 518 stores the URL of a website to be searched. The URL not to be searched field 520 stores the URL of a website excluded from the website to be searched. The crawl depth field 522 stores the crawl depth (the number of links followed at the website to be crawled). The crawl interval field 524 stores the crawl interval (the interval at which a crawl is performed). The number of crawling threads field 526 stores the number of crawling threads (the number of crawl processes that run simultaneously (or in parallel)).

The crawl definition acquiring module 120 is connected to the portlet setting data 115 and the crawl executing module 130. The crawl definition acquiring module 120 acquires the definition of a crawl from the portlet setting data 115. More specifically, the crawl definition acquiring module 120 acquires the crawl definition table 500 required for a crawl, and transmits the crawl definition table 500 to the crawl executing module 130.

Figure 6:
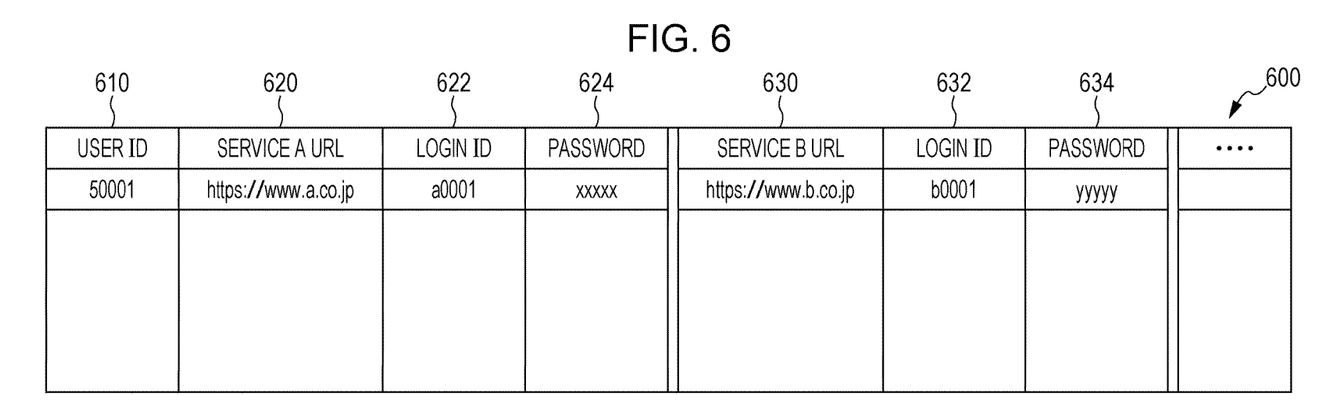
FIG. 6 illustrates an example of the data structure of a user account table.

The user account data 125 is connected to the crawl executing module 130. The user account data 125 stores information on plural websites and the access rights of the user to the plural websites, in association with each other. That is, the user account data 125 stores the data on the accounts of the user of the service content data processing apparatuses 190. When performing a crawl, the crawl executing module 130 refers to the user account data 125 in order to perform an impersonation. For example, the user account data 125 stores a user account table 600. The crawl executing module 130 logs in each service content data processing apparatus 190, using the data in the user account table 600, and accesses the data in that service content data processing apparatus 190. FIG. 6 illustrates an example of the data configuration of the user account table 600. The user account table 600 includes a user ID field 610, a service A URL field 620, a login ID field 622, a password field 624, a service B URL field 630, a login ID field 632, and a password field 634. The user ID field 610 stores information (user identification (ID)) for uniquely identifying a user (a login user of the information processing apparatus 100), in this exemplary embodiment. The service A URL field 620 stores the URL of a service A (the service A content data processing apparatus 190A). The login ID field 622 stores the login ID for the service A (ID of the login user on the service A content data processing apparatus 190A). The password field 624 stores the password for the service A. The service B URL field 630 stores the URL of a service B (the service B content data processing apparatus 190B). The login ID field 632 stores the login ID for the service B (ID of the login user on the service B content data processing apparatus 190B). The password field 634 stores the password for the service B. Obviously, the information is not limited to the login ID and password, and may be any information used to access each service content data processing apparatus 190. Further, the information may be encrypted. In the case where plural passwords are required, the plural passwords are stored.

The crawl executing module 130 is connected to the crawl definition acquiring module 120, the user account data 125, the crawl result index data 135, the service A content data processing apparatus 190A, the service B content data processing apparatus 190B, and the service C content data processing apparatus 190C. The crawl executing module 130 serves as an indexer. The crawl executing module 130 accesses each of the plural websites, in accordance with the access rights of the user stored in the user account data 125. Generally, each page to be crawled has a different Uniform Resource Locator (URL), and the indexer creates a database of the search results for each URL. That is, the crawl executing module 130 executes a crawl on the service content data processing apparatus 190, in accordance with the definition of a crawl acquired by the crawl definition acquiring module 120. In this step, in order to access the service content data processing apparatus 190, the crawl executing module 130 performs an impersonation using the user account table 600. Further, existing techniques may be used to generate the index. For example, techniques such as morphological analysis and tf-idf may be used to extract keywords.

Note that it is only necessary to perform a crawl, generate an index, and store the index in the crawl result index data 135, before the search execution processing module 150 starts a search. Further, the crawl executing module 130 may start a crawl in response to a login to a portal site.

Further, the crawl executing module 130 may mark and cache an inaccessible URL during a crawl so as not to check the access rights every time. The cache may be updated when a page indicated by the URL is updated.

Figure 7:
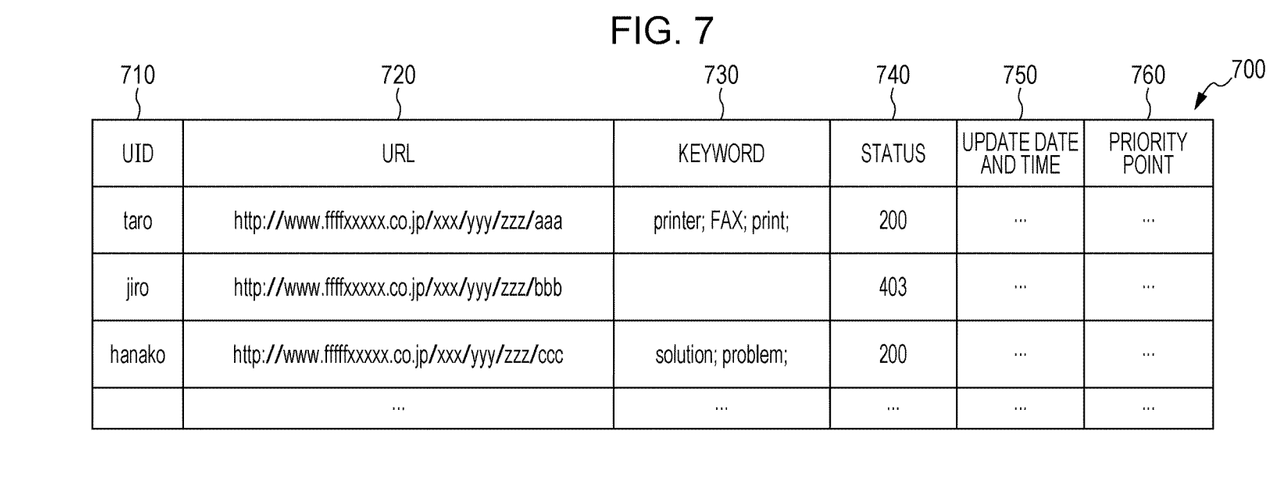
FIG. 7 illustrates an example of the data structure of an index table.

The crawl result index data 135 is connected to the crawl executing module 130, the search executing module 160 of the search execution processing module 150, and the index sort processing module 180. The crawl result index data 135 stores the index generated by the crawl executing module 130 in association with the user. That is, an access is made to each of the plural websites in accordance with the access rights of the user, and the index of the content of the plural websites are stored in association with the user. That is, the crawl result index data 135 stores data on the crawl result, and is referred to when the search execution processing module 150 executes a search. For example, the crawl result index data 135 stores an index table 700. FIG. 7 illustrates an example of the data configuration of the index table 700. The index table 700 includes a UID field 710, a URL field 720, a keyword field 730, a status field 740, an update date and time field 750, and a priority point field 760. The UID field 710 stores the user ID (UID). The URL field 720 stores the URL accessed (crawled) with the user ID. The keyword field 730 stores keywords (index) in the website at the URL. The status field 740 stores the status indicating whether the access to the URL is successful. For example, "200" is used as information indicating that the URL is accessible, and "403" is used as information indicating that the URL is not accessible. The update date and time field 750 stores the date and time (year, month, day, hour, minute, second, and fraction of a second, or a combination thereof) when the URL is updated. The priority point field 760 stores a priority point as information indicating the degree of priority with which the URL is to be displayed.

The search keyword receiving module 155 is connected to the search executing module 160. The search keyword receiving module 155 receives, on the portal site, an input of search conditions for the plural websites from the user. For example, the search keyword receiving module 155 receives a keyword that is input for a search, in accordance with an operation by the user.

The search executing module 160 is connected to the search keyword receiving module 155, the search result acquiring module 165, the user search execution history data 175, and the crawl result index data 135 of the crawl execution processing module 110. The search executing module 160 searches the index stored in association with the user in the crawl result index data 135, in accordance with the search conditions input by the search keyword receiving module 155. For example, the search executing module 160 searches the index in the crawl result index data 135. After executing the search, the search executing module 160 stores a search history in the user search execution history data 175.

The search result acquiring module 165 is connected to the search executing module 160 and the search result displaying module 170. The search result acquiring module 165 acquires the result of the search executed by the search executing module 160.

The search result displaying module 170 is connected to the search result acquiring module 165. The search result displaying module 170 displays the search results on a display device, such as a liquid crystal display, so as to be viewed by the user who issued the search instruction. Generally, the search result displaying module 170 displays the search results on a screen on which the search instruction is issued.

The user search execution history data 175 is connected to the search executing module 160 and the index sort processing module 180. The user search execution history data 175 stores the search conditions input by the user as a history. For example, the user search execution history data 175 stores the search conditions input by the user and the result of the search performed in accordance with the search conditions. Further, in order to perform an optimization process based on sorting of a crawl index, the user search execution history data 175 is referred to by the index sort processing module 180.

The index sort processing module 180 is connected to the user search execution history data 175 and the crawl result index data 135 of the crawl execution processing module 110. The index sort processing module 180 sorts, for the information stored in the crawl result index data 135, the index stored in association with the user, on the basis of the history stored in the user search execution history data 175.

The service content data processing apparatuses 190 (the service A content data processing apparatus 190A, the service B content data processing apparatus 190B, and the service C content data processing apparatus 190C) are connected to the crawl executing module 130 of the crawl execution processing module 110. Each service content data processing apparatus 190 stores content data of its service site. That is, each service content data processing apparatus 190 stores data that is displayed in the portlet. The service content data processing apparatuses 190 may include not only a service content data processing apparatus 190 that is accessible by the user, but also a service content data processing apparatus 190 that is not accessible by the user.

In the example of FIG. 1, three service content data processing apparatuses 190 are illustrated. However, it is obvious that only two or more service content data processing apparatuses 190 are needed. Further, it is not necessary that portlets corresponding to all the service content data processing apparatus 190 do not have to be included in one website, and portlets to be included are selected in accordance with the user settings (or default settings). Further, plural portlets may be assigned to one service content data processing apparatus 190. In this case, the URLs assigned to the respective portlets are often URLs in the service content data processing apparatus 190. For example, the service content data processing apparatus 190 may be one that displays information (for example, the number of pages to be printed, failure information, or the like) on a copying machine, a facsimile machine, a scanner, a printer, or a multifunction apparatus (an image processing apparatus having functions of any two or more of a scanner function, a printer function, a copying function, a facsimile function, and the like) which is managed by the user.

An overview of processing performed by the information processing apparatus 100 will be described.

The crawler generates an index for each of portlets on the portal site. In the case of searching for service information provided via the portlets from the portal site, a search is performed in the service information that is accessible by the login user. That is, it appears to the user that, when a search is performed on the websites associated with the respective portlets, the search is performed on the portal site. Further, the order of search execution is determined for each login user, on the basis of the search execution history.

Figure 2:
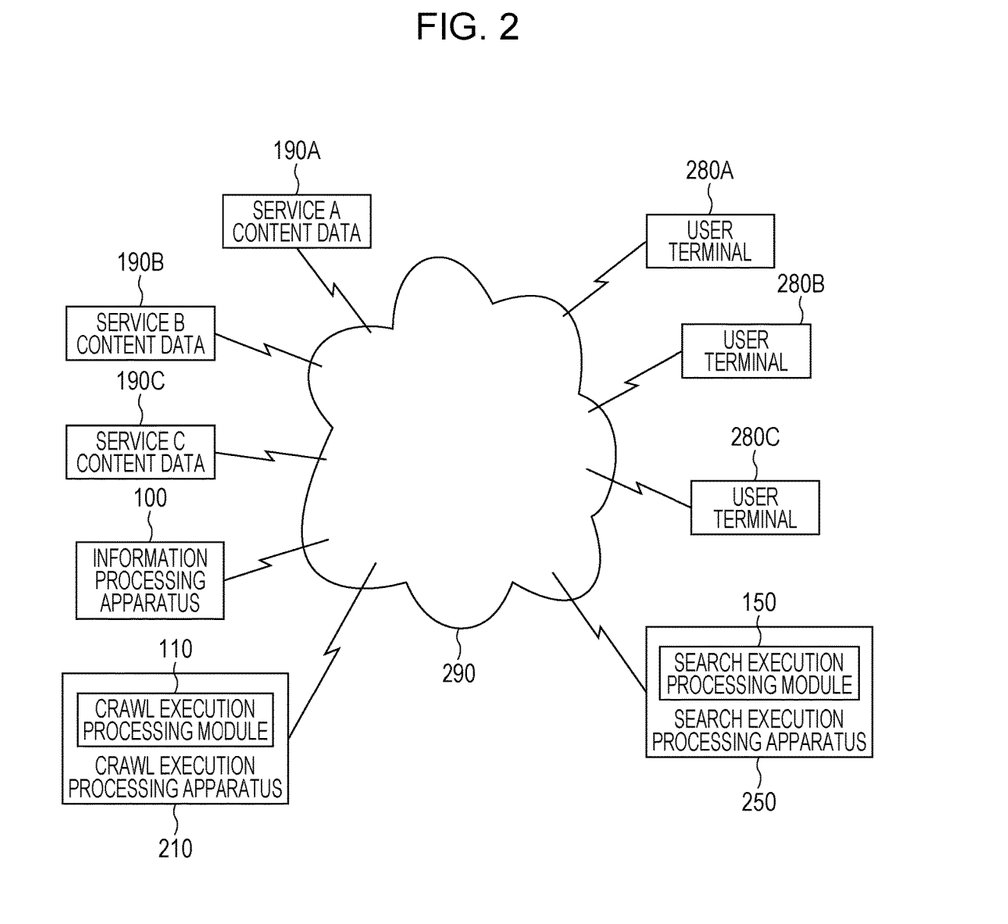
FIG. 2 illustrates an example of the configuration of a system to which the exemplary embodiment is applied.

FIG. 2 illustrates an example of the configuration of a system to which this exemplary embodiment is applied.

The service A content data processing apparatus 190A, the service B content data processing apparatus 190B, the service C content data processing apparatus 190C, the information processing apparatus 100, a crawl execution processing apparatus 210, a search execution processing apparatus 250, a user terminal 280A, a user terminal 280B, and a user terminal 280C are connected to each other through a communication line 290. The communication line 290 may be a wireless line, a wired line, or a combination of these. For example, the communication line 290 may be the Intranet, an intranet, or the like serving as a communication infrastructure.

The information processing apparatus 100 generates, in advance, an index for a search from the service content data processing apparatuses 190 accessible by each user, by performing a crawl process.

The user operates the user terminal 280 so as to log in to the portal site and issue a search instruction. The information processing apparatus 100 searches the index corresponding to the user who issued the search instruction, and displays the result. Accordingly, information accessible by the user is displayed in the search results.

The crawl execution processing module 110 and the search execution processing module 150 of the information processing apparatus 100 may be implemented as separate information processing apparatuses. For example, in an exemplary embodiment, the crawl execution processing apparatus 210 may include the crawl execution processing module 110, and the search execution processing apparatus 250 may include the search execution processing module 150.

The functions of the information processing apparatus 100, the crawl execution processing apparatus 210, and the search execution processing apparatus 250 may be implemented as a cloud service.

Figure 3:
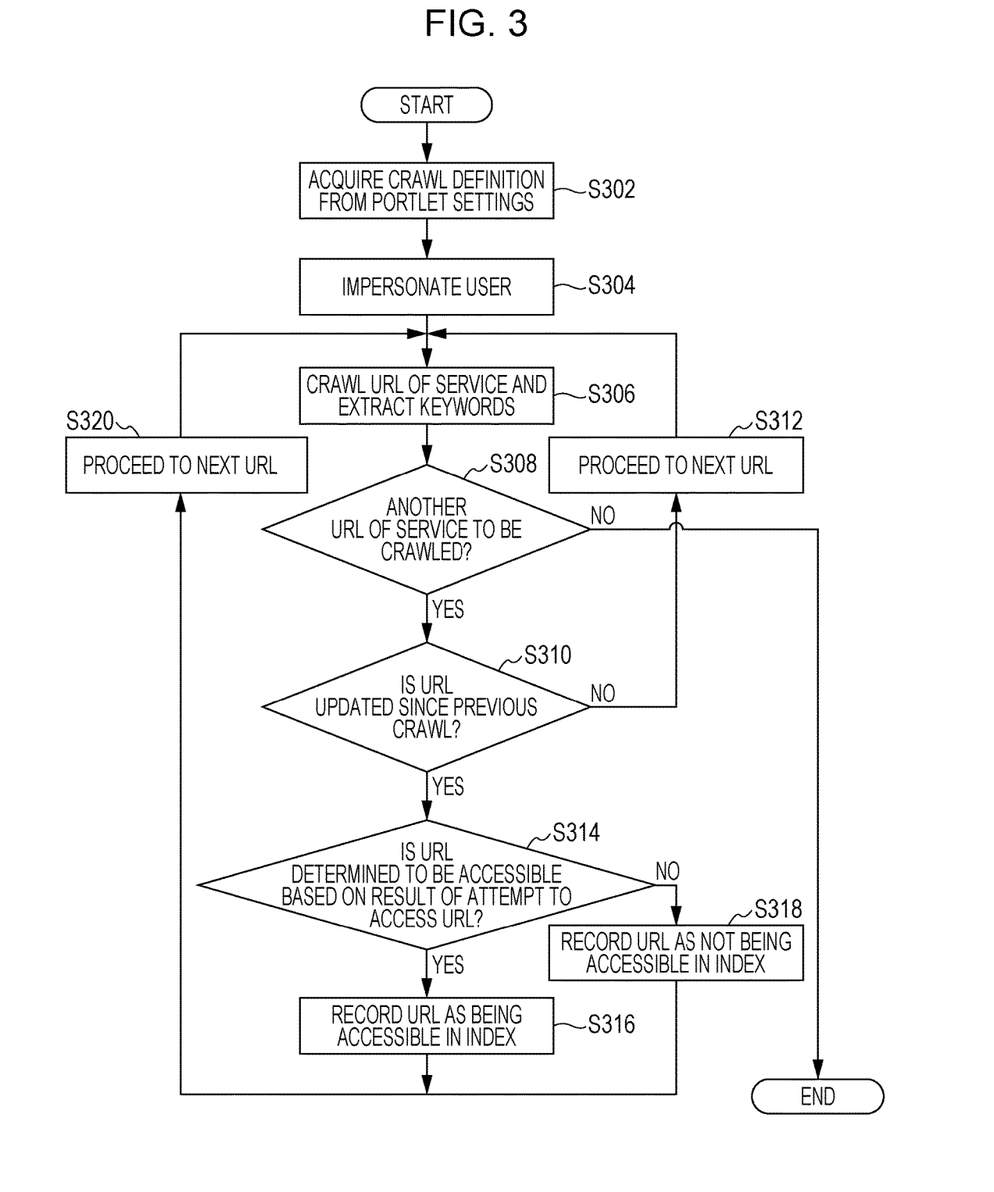
FIG. 3 is a flowchart illustrating an example of a process according to the exemplary embodiment.

FIG. 3 is a flowchart illustrating an example of a process (an example of a crawl execution process performed by the crawl execution processing module 110) according to this exemplary embodiment.

When an impersonation login is made to the service content data processing apparatus 190, and a crawl defined for each portlet is executed. When performing a crawl, a return code of HTTP (more specifically, "200", "403", or the like) is recorded in the index. Thus, the information indicating whether the URL is accessible by the user may be used when a search is performed afterward.

By performing the process illustrated in the example of FIG. 3 periodically at the intervals specified in the crawl definition for each user, index data of the crawl is created for each portlet.

In step S302, the crawl definition acquiring module 120 acquires a crawl definition from the portlet settings.

In step S304, the crawl executing module 130 impersonates the user.

In step S306, the crawl executing module 130 crawls a URL of a service and extracts keywords.

In step S308, the crawl executing module 130 determines whether there is another URL of the service to be crawled. If there is another URL of the service to be crawled, the process proceeds to step S310. If not, the process ends.

In step S310, the crawl executing module 130 determines whether the URL is updated since the previous (last) crawl. If the URL is updated, the process proceeds to step S314. If not, the process proceeds to step S312.

In step S312, the process proceeds to the next URL. Thus, the crawl executing module 130 repeats the operations of step S306 and the subsequent steps.

In step S314, the crawl executing module 130 determines whether the URL is accessible, on the basis of the result of an attempt to access the URL (impersonation). If the URL is accessible, the process proceeds to step S316. If not, the process proceeds to step S318.

In step S316, the crawl executing module 130 records the URL as being accessible in the index. More specifically, the crawl executing module 130 sets "200" in the status field 740 of the index table 700.

In step S318, the crawl executing module 130 records the URL as not being accessible in the index. More specifically, the crawl executing module 130 sets "403" in the status field 740 of the index table 700.

In step S320, the process proceeds to the next URL. Thus, the crawl executing module 130 repeats the operations of step S306 and the subsequent steps.

Figure 4:
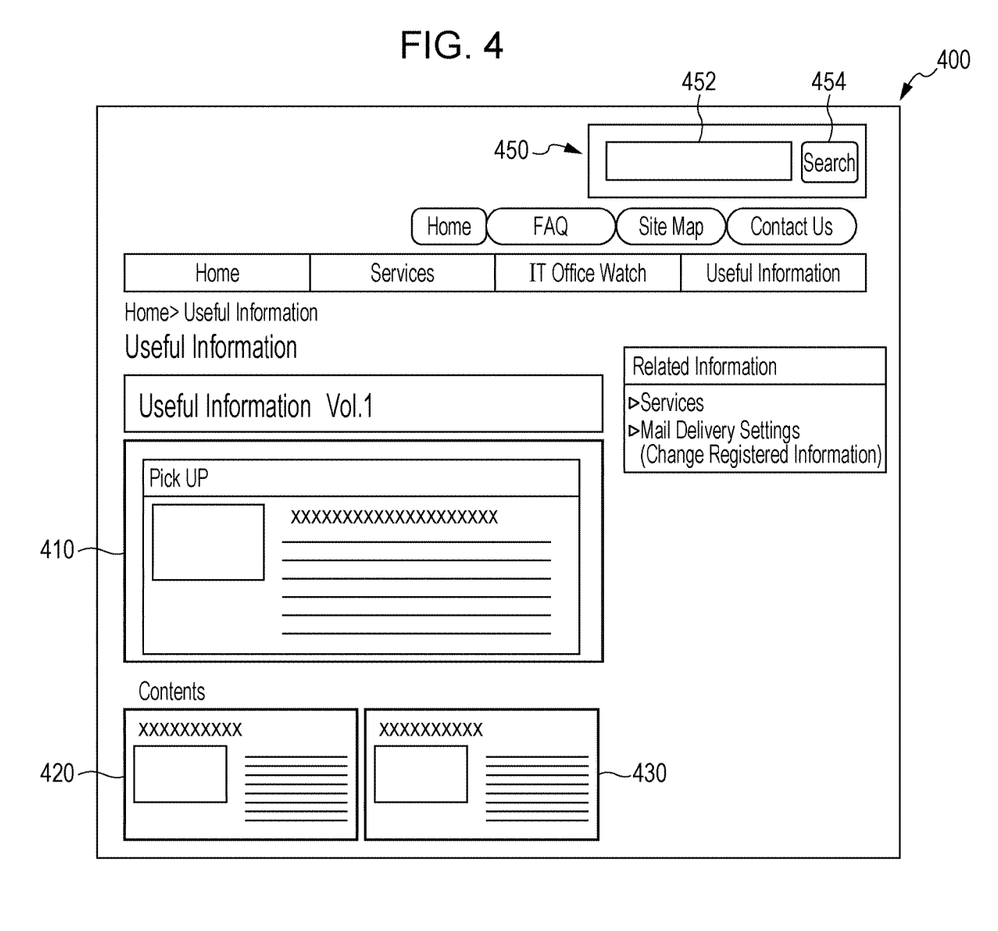
FIG. 4 illustrates an example of a process according to the exemplary embodiment.

FIG. 4 illustrates an example of a process according to this exemplary embodiment.

A portal screen 400 is an example of a screen that is displayed when logging in to the portal site in accordance with a user operation.

The portal screen 400 includes portlet display areas 410, 420, and 430, and a search area 450. Each of the portlet display areas 410, 420, and 430 is set by the user, and displays information stored in the service content data processing apparatus 190.

The search area 450 includes a search keyword input box 452 and a search button 454. When a keyword to be searched for is input in the search keyword input box 452 and the search button 454 is selected, a search instruction is issued.

Figure 8:
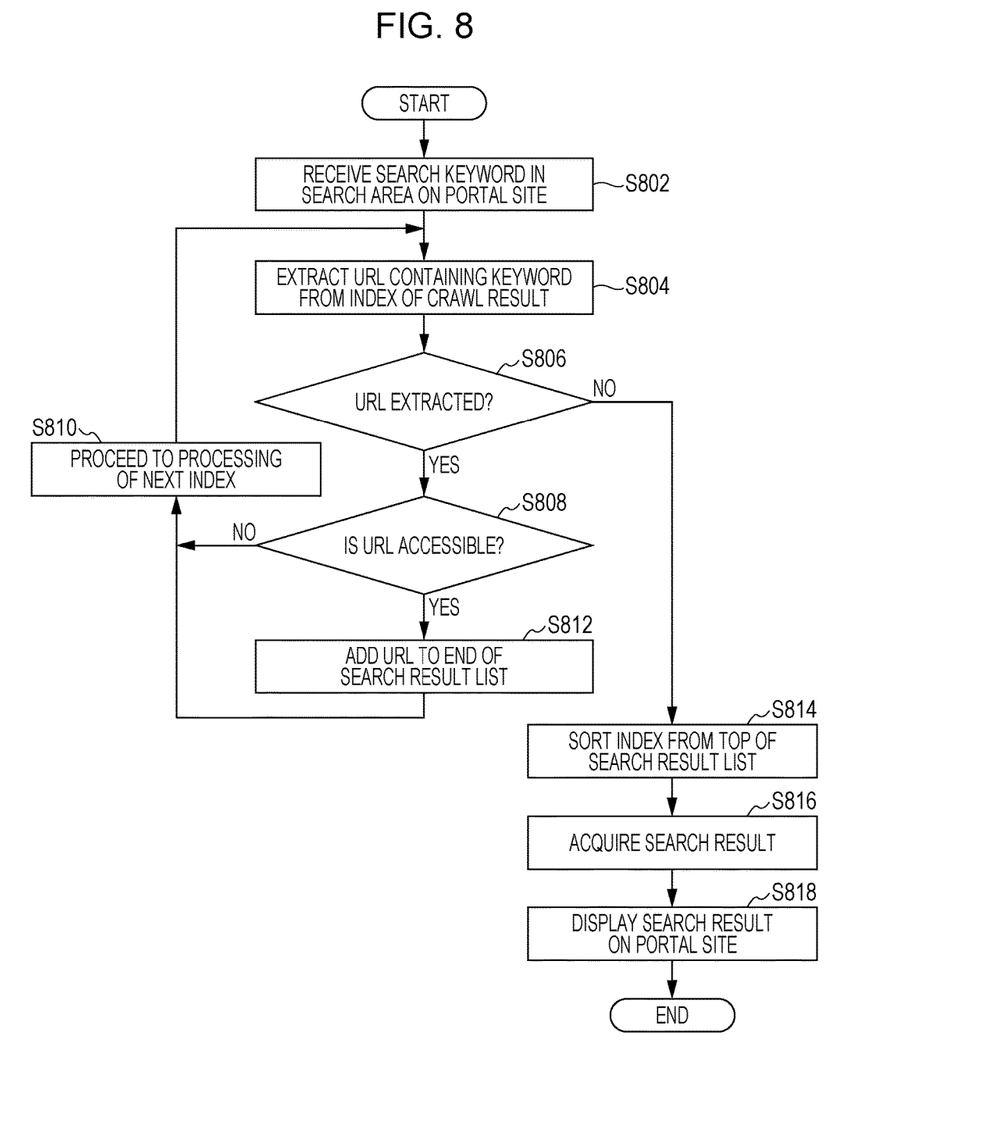
FIG. 8 is a flowchart illustrating an example of a process according to the exemplary embodiment.

FIG. 8 is a flowchart illustrating an example of a process (an example of a search process performed by the search execution processing module 150) according to this exemplary embodiment.

Using the keyword that is input by the user so as to be searched for, URLs that contain the keyword are extracted from the index of the crawl result. From among the extracted URLs, accessible URLs are adopted as the search results.

After the completion of the search, the index is sorted on the basis of the search results, thereby improving the search efficiency in the subsequent searches.

The process illustrated in the example of FIG. 8 is executed for each portlet. Then, all the results are merged so as to be displayed to the user as the search results of the portal site.

In step S802, when the search button 454 is selected (when a search instruction is issued) by an operation of the user, the search keyword receiving module 155 receives a search keyword in the search keyword input box 452 in the search area 450 on the portal site.

Figure 9:
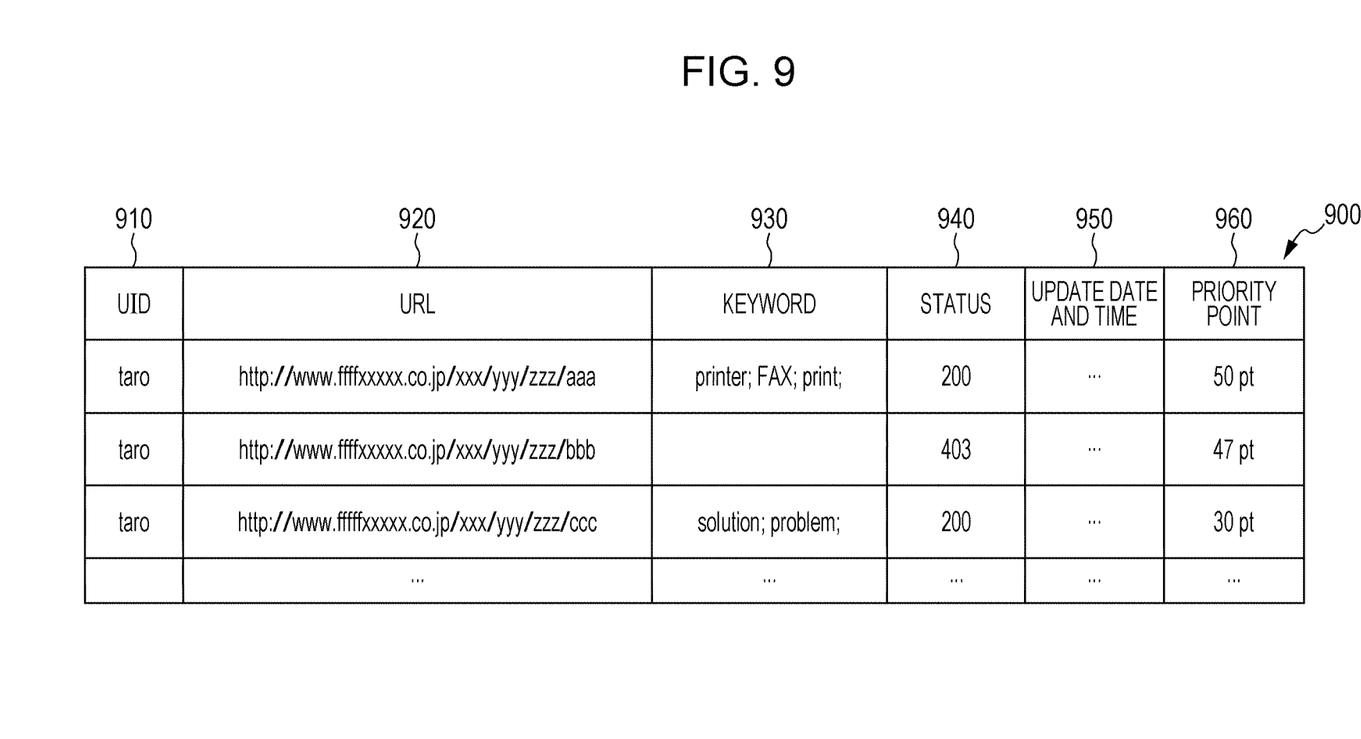
FIG. 9 illustrates an example of the data structure of an index table.

In step S804, the search executing module 160 extracts a URL that contains the keyword from the index of the crawl result (more specifically, an index table 900). FIG. 9 illustrates an example of the data configuration of the index table 900. The index table 900 has the same configuration as that of the index table 700 illustrated in FIG. 7, but is an index table for the user. More specifically, records that match the login user are extracted are extracted on the basis of a UID field 910 of the index table 900. That is, the index table 900 only includes records with the login user "taro" in the UID field 910. Then, URLs with a keyword in the keyword field 930 of the index table 900 that matches the keyword are extracted as the search results.

In step S806, the search executing module 160 determines whether a URL is extracted. If a URL is extracted, the process proceeds to step S808. If not, the process proceeds to step S814.

In step S808, the search executing module 160 determines whether the URL is accessible. If the URL is accessible, the process proceeds to step S812. If not, the process proceeds to step S810. More specifically, the search executing module 160 refers to a status field 940 of the index table 900, and removes a URL with the status ("403") indicating that a URL is not accessible from the search results.

In step S810, the process proceeds to processing of the next index.

Figure 10:
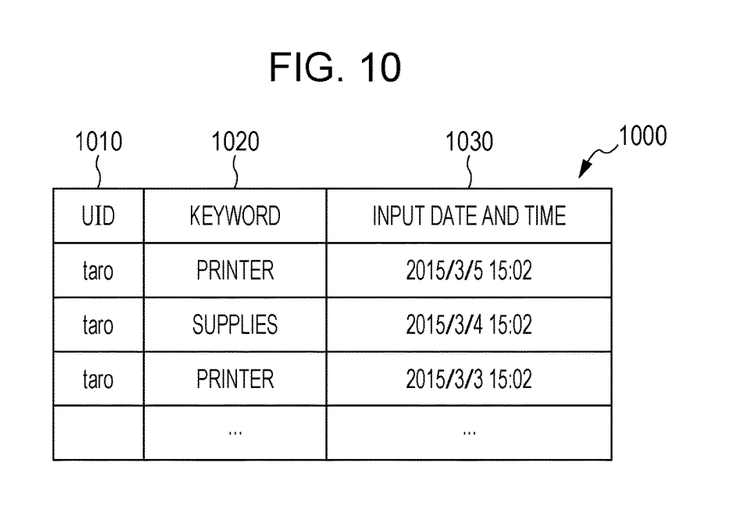
FIG. 10 illustrates an example of the data configuration of a keyword input history table.

In step S812, the search executing module 160 adds the search result to the end of the search result list. For example, the search executing module 160 adds the keyword to a keyword input history table 1000. FIG. 10 illustrates an example of the data configuration of the keyword input history table 1000.

The keyword input history table 1000 contains a UID field 1010, a keyword field 1020, and an input date and time field 1030. The UID field 1010 stores the user ID. The keyword field 1020 stores a keyword (a search keyword) specified in a search instruction issued by the user. The input date and time field 1030 stores the date and time when the search instruction is issued.

In step S814, the index sort processing module 180 sorts the index from the top of the search result list. More specifically, the index sort processing module 180 sorts the index data by the date and time or the frequency in the keyword input history. For example, the index sort processing module 180 calculates a priority point on the basis of the number of occurrences of keywords in the keyword input history table 1000, and sorts the index data. For example, in the case where a keyword "printer" occurs 31 times, "FAX" occurs 11 times, "print" occurs 8 times, the priority point is calculated by the following equation:

printer (31 times)+FAX (11 times)+print (8 times)
=50 pt

That is, a URL with a greater number of words used as search keywords previously has a higher priority point, and is displayed with priority over other URLs. More specifically, such a URL may have a higher display order in the search results. Further, the URL may be displayed in a form (color, the thickness of the character, blinking display, or the like) different from that of other search results.

In step S816, the search result acquiring module 165 acquires the search results.

In step S818, the search result displaying module 170 displays the search results on the portal site.

Figure 11:
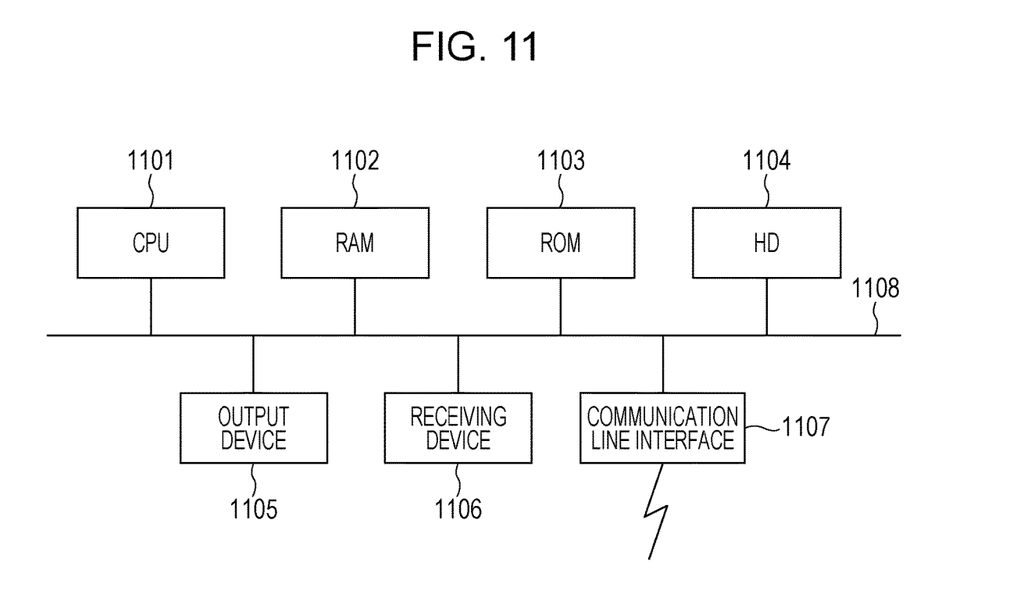
FIG. 11 is a block diagram illustrating an example of the hardware configuration of a computer that implements the exemplary embodiment.

The computer that executes a program implementing this exemplary embodiment has the same hardware configuration as a general computer as illustrated in FIG. 11. More specifically, the computer is a personal computer or a computer capable of serving as a server. For example, the computer uses a CPU 1101 as a processing unit (an arithmetic unit), and uses a RAM 1102, a ROM 1103, and an HD 1104 as storage devices. The HD 1104 may be, for example, a hard disk or a solid state drive (SSD). The computer includes: the CPU 1101 that executes programs, such as the crawl definition acquiring module 120, the search keyword receiving module 155, the search executing module 160, the search result acquiring module 165, the search result displaying module 170, and the index sort processing module 180; the RAM 1102 storing such programs and data; the ROM 1103 storing a program for starting the computer; the HD 1104 as an auxiliary storage device (or a flash memory or the like) having the functions of the portlet setting data 115, the user account data 125, the crawl result index data 135, the user search execution history data 175, and the like; a receiving device 1106 that receives data on the basis of an operation performed on a keyboard, a mouse, a touch panel or a microphone by the user; an output device 1105 such as a CRT, a liquid-crystal display, and a speaker; a communication line interface 1107 such as a network interface card for connection with a communication network; and a bus 1108 interconnecting these components for data exchange. Two or more of such computers may be connected to each other via a network.

When the above exemplary embodiment is implemented by a computer program, the computer program as software is read by a system having the above-described hardware configuration, and thus the above exemplary embodiment is implemented through a cooperation of the software and hardware resources.

The hardware configuration illustrated in FIG. 11 is merely an example of the configuration. The exemplary embodiment is not limited to the configuration illustrated in FIG. 11, and may be configured in any manner as long as the modules described in the exemplary embodiment are executable. For example, some of the modules may be implemented by dedicated hardware (for example, application specific integrated circuit (ASIC) or the like), and some of the modules may be implemented in an external system and may be connected via a communication line. Furthermore, plural systems, each being the system illustrated in FIG. 11, may be connected to one another via a communication line so as to operate in cooperation with one another. Alternatively, the modules may be integrated into an apparatus other than a personal computer, such as a mobile information and communication device (including a cellular phone, smartphone, a mobile device, and a wearable computer), home information appliance, a robot, a copying machine, a facsimile machine, a scanner, a printer, and a multifunction apparatus.

While portlets are used to create a portal site in the example described in the above exemplary embodiment, an inline frame (iframe) in HTML or the like may be used.

The above-described program may be provided by being stored in a recording medium or by a communication unit. In this case, for example, the above-described program may be recognized as an invention of a "computer readable recording medium having a program recorded therein".

The "computer readable recording medium having a program recorded therein" is a computer readable recording medium storing a program and used for installation, execution, distribution of the program, or the like.

Examples of the recording medium include digital versatile discs (DVDs), such as a DVD-R, a DVD-RW, and a DVD-RAM which are based on the standard designed by the DVD forum, and such as a DVD+R and a DVD+RW which are based on the standard designed by DVD+RW. Examples of the recording medium also include compact discs (CDs), such as a CD-ROM, a CD recordable (CD-R), and a CD rewritable (CD-RW). Examples of the recording medium also include a Blu-ray (registered trademark) Disc, a magneto-optical disc (MO), a flexible disk (FD), a magnetic tape, a hard disk, a read only memory (ROM), an electrically erasable and programmable ROM (EEPROM (registered trademark)), a flash memory, a random access memory (RAM), and a secure digital memory card (SD memory card).

The above-described program or part of the program may be recorded on the recording medium so as to be stored or distributed. Alternatively, the program or part of the program may be transmitted via a wired network used for a local area network (LAN), a metropolitan area network (MAN), a wide area network (WAN), the Internet, an intranet, or an extranet, or may be transmitted via a wireless communication network. Furthermore, the program or part of the program may be transmitted using a transmission medium including a combination of the foregoing media, or may be transmitted using carrier waves.

Furthermore, the foregoing program may be part of another program, and may be recorded on a recording medium together with another program. Also, the program may be divided and recorded on multiple recording media. The program may be recorded in any form such as a compressed form or an encrypted form, as long as the program may be decompressed or decrypted.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a first memory that stores information on a plurality of websites and access rights of a user to the plurality of websites, in association with each other;
   an indexing unit that: (i) accesses each of the plurality of websites in accordance with the access rights of the user, each of the plurality of websites being accessed through a portlet site, which is a portal site associated with one website, (ii) acquires at least one parameter of a crawl to be performed on each of the portlet sites of each of the plurality of websites, each at least one parameter being a portlet setting of the crawl performed for each portlet site, and (iii) generates an index for each of the portlet sites of the plurality of websites before performing a search processing;
   a second memory that stores each of the indexes generated by the indexing unit in association with the user;
   a third memory that stores previously inputted search conditions and search results generated by executing searches based on the previously inputted search conditions;
   a controller that controls a display to display a portal site representing an entry point to the plurality of websites;
   a receiving unit that receives, on the portal site, an input of search conditions for the plurality of websites from the user; and
   a searching unit that performs the search processing by searching each of the indexes of the portlet sites stored in association with the user in the second memory, in accordance with the input search conditions, and based on the previously inputted search conditions and search results stored in the third memory.

2. The information processing apparatus according to claim 1, further comprising:
   a sorting unit that sorts, for information stored in the second memory, the index stored in association with the user based on the previously inputted search conditions and search results stored in the third memory.

3. An information processing apparatus comprising:
   a memory that: (i) accesses each of a plurality of websites in accordance with access rights of a user, each of the plurality of websites being accessed through a portlet site, which is a portal site associated with one website, (ii) acquires at least one parameter of a crawl to be performed on each of the portlet sites of each of the plurality of websites, each at least one parameter being a portlet setting of the crawl performed for each portlet site, and (iii) stores an index for each of the portlet sites of the plurality of websites each in association with the user before performing a search processing, and previously inputted search conditions and search results generated by executing searches based on the previously inputted search conditions;
   a controller that controls a display to display a portal site representing an entry point to the plurality of websites;
   a receiving unit that receives, on the portal site, an input of search conditions for the plurality of websites from the user; and
   a searching unit that performs the search processing by searching each of indexes of the portlet sites stored in association with the user in the memory, in accordance with the input search conditions, and based on the previously inputted search conditions and search results stored in the memory.

4. An information processing method comprising:
   first storing information on a plurality of websites and access rights of a user to the plurality of websites, in association with each other;
   accessing each of the plurality of websites in accordance with the access rights of the user, each of the plurality of websites being accessed through a portlet site, which is a portal site associated with one website;
   acquiring at least one parameter of a crawl to be performed on each of the portlet sites of each of the plurality of websites, each at least one parameter being a portlet setting of the crawl performed for each portlet site;
   generating an index for each of the portlet sites of the plurality of websites before performing a search processing;

second storing each of the indexes generated in the accessing in association with the user;
third storing of previously inputted search conditions and search results generated by executing searches based on the previously inputted search conditions;
controlling a display to display a portal site representing an entry point to the plurality of websites;
receiving, on the portal site, an input of search conditions for the plurality of websites from the user; and
performing the search processing by searching each of the indexes of the portlet sites stored in association with the user in the second storing, in accordance with the input search conditions, and based on the stored previously inputted search conditions and search results.

5. A non-transitory computer readable medium storing a program causing a computer to execute a process for information processing, the process comprising:
first storing information on a plurality of websites and access rights of a user to the plurality of websites, in association with each other;
accessing each of the plurality of websites in accordance with the access rights of the user, each of the plurality of websites being accessed through a portlet site, which is a portal site associated with one website;
acquiring at least one parameter of a crawl to be performed on each of the portlet sites of each of the plurality of websites, each at least one parameter being a portlet setting of the crawl performed for each portlet site;
generating an index for each of the portlet sites of the plurality of websites before performing a search processing;
second storing each of the indexes generated in the accessing in association with the user;
third storing of previously inputted search conditions and search results generated by executing searches based on the previously inputted search conditions;
controlling a display to display a portal site representing an entry point to the plurality of websites;
receiving, on the portal site, an input of search conditions for the plurality of websites from the user; and
performing the search processing by searching each of the indexes of the portlet sites stored in association with the user in the second storing, in accordance with the input search conditions, and based on the stored previously inputted search conditions and search results.

6. A non-transitory computer readable medium storing a program causing a computer to execute a process for information processing, the process comprising:
accessing each of a plurality of websites in accordance with access rights of a user, each of the plurality of websites being accessed through a portlet site, which is a portal site associated with one website;
acquiring at least one parameter of a crawl to be performed on each of the portlet sites of each of the plurality of websites, each at least one parameter being a portlet setting of the crawl performed for each portlet site;
storing: (i) an index for each of the portlet sites of the plurality of websites each in association with the user before performing a search processing, and (ii) previously inputted search conditions and search results generated by executing searches based on the previously inputted search conditions;
controlling a display to display a portal site representing an entry point to the plurality of websites;
receiving, on the portal site, an input of search conditions for the plurality of websites from the user; and
performing the search processing by searching each of the indexes of the portlet sites stored in association with the user in the accessing, in accordance with the input search conditions, and based on the stored previously inputted search conditions and search results.

* * * * *